US006505426B2

(12) United States Patent
Yang

(10) Patent No.: US 6,505,426 B2
(45) Date of Patent: Jan. 14, 2003

(54) COVERED BUTTON WITH ADVERTISING DECORATIVE OBJECT

(76) Inventor: Shih-Sheng Yang, PO Box 82-144, Taipei (TW)

( * ) Notice: Subject to any disclaimer, the term of this patent is extended or adjusted under 35 U.S.C. 154(b) by 0 days.

(21) Appl. No.: 09/759,197

(22) Filed: Jan. 16, 2001

(65) Prior Publication Data

US 2002/0092136 A1 Jul. 18, 2002

(51) Int. Cl.[7] .................................. B29C 39/12
(52) U.S. Cl. .................................. 40/315; 264/247
(58) Field of Search .................................. 40/315; 264/273, 264/274, 245–247; 267/273, 274, 245, 246, 247

(56) References Cited

U.S. PATENT DOCUMENTS 2,285,963 A * 6/1942 Gits et al. .................. 264/247
5,811,175 A * 9/1998 Howie, Jr. .................. 264/115

* cited by examiner

*Primary Examiner*—Cassandra H. Davis
(74) *Attorney, Agent, or Firm*—Leong C. Lei

(57) ABSTRACT

A multi colors covered button with advertising object comprising at least a blank element, a male fastening element and a covering material, characterized in that the blank element consists of a net layer having a plurality of through holes, a patterned block connected to the net layer, and the through holes in communication with the external portion of the patterned block and a recessed interior section, the blank element is positioned by the top and bottom mold such that a covering material can be ejected to cover the entire net layer and the covering material is extended to cover the extemal portion of the block 12 and the recessed portion, thereby a covered button with more than two different type of materials and colors is formed.

1 Claim, 8 Drawing Sheets

COVERED BUTTON WITH ADVERTISING DECORATIVE OBJECT

BACKGROUND OF THE INVENTION

1. Field of the Invention

The present invention relates to a covered button with advertising decorative object, and in particular a button structure with trade mark design formed on the covered button.

2. Description of the Prior Art

Taiwanese Patent Application No. 87117160, entitled "A Method and an Apparatus in Manufacturing Thin Button", relates to a process involving a first and a second covering process on a button, forming into a button with two different colors. Me covering can be done with a soft and/or a hard material. However, in this conventional method, a single type of material is used, i.e., both are made of plastic material. Thus, it is a need to change the button body made from material of different categories.

Applicant Taiwan Patent Application No. 88209750 discloses a covered button being made of plastic. However, this method does not allow the making of a precise pattern button.

Accordingly, it is an object of the present invention to provide a multi colors, covered button with decorative object such that the pattern thereon is obvious and significant, and any complicated patterns or designs can be formed.

SUMMARY OF THE INVENTION

Accordingly, it is an object of the present invention to provide a covered button with advertising decorative object, wherein a strap with decoration can be provided to the button to form the pulling tab of a zip fastener.

Yet another object of the present invention is to provide a multi colors covered button with advertising object comprising at least a blank element (10), a male fastening element (17) and a covering material (18), characterized in that the blank element consists of a net layer (11) having a plurality of through holes (13), a patterned block (12) connected to the net layer (11), and the through holes (13) the in communication with the external portion (15) of the patterned block (12) and a recessed interior section (16), the blank element (10) is positioned by the top and bottom mold (1, 2) such that a covering material (18) can be ejected to cover the entire net layer (11) and the covering material is extended to cover the external portion (15) of the block 12 and the recessed portion (16), thereby a covered button with more than two different type of materials and colors is formed.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principle of the present invention is shown by way of illustrative example.

DETAILED DESCRIPTION OF THE PRESENT INVENTION

Figure 1:
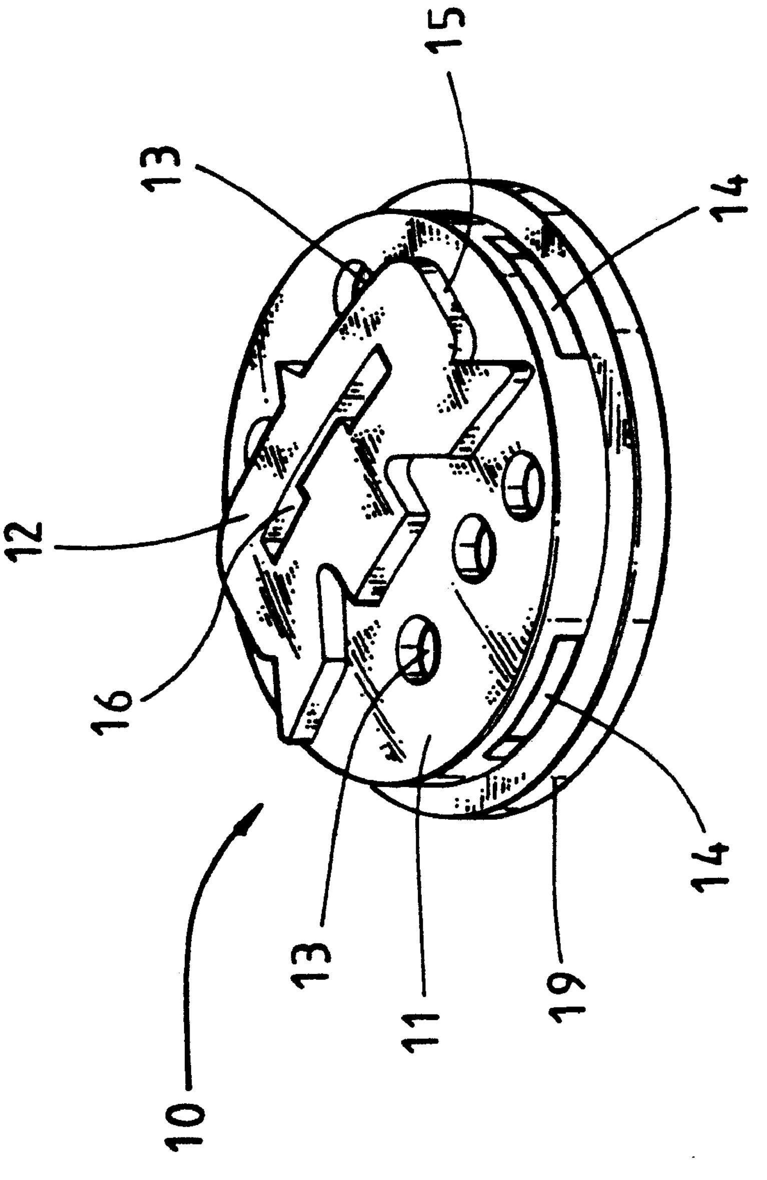
FIG. 1 is a perspective view showing the blank material having specific pattern and with a net layer in accordance with the present invention.
Figure 2:
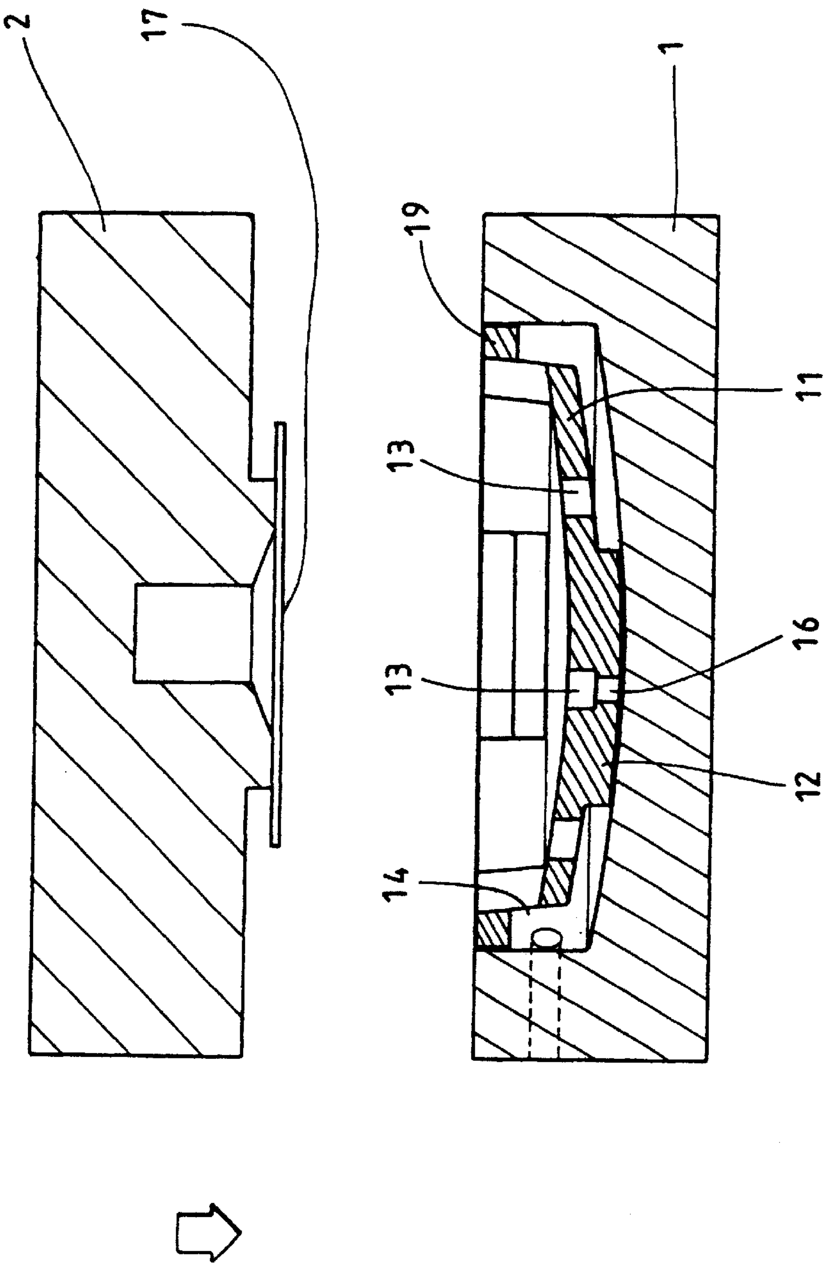
FIG. 2 is a schematic sectional view showing the blank material being placed in a plastic mold and prior to a male fastener being ejected for combination in accordance with the present invention.
Figure 3:
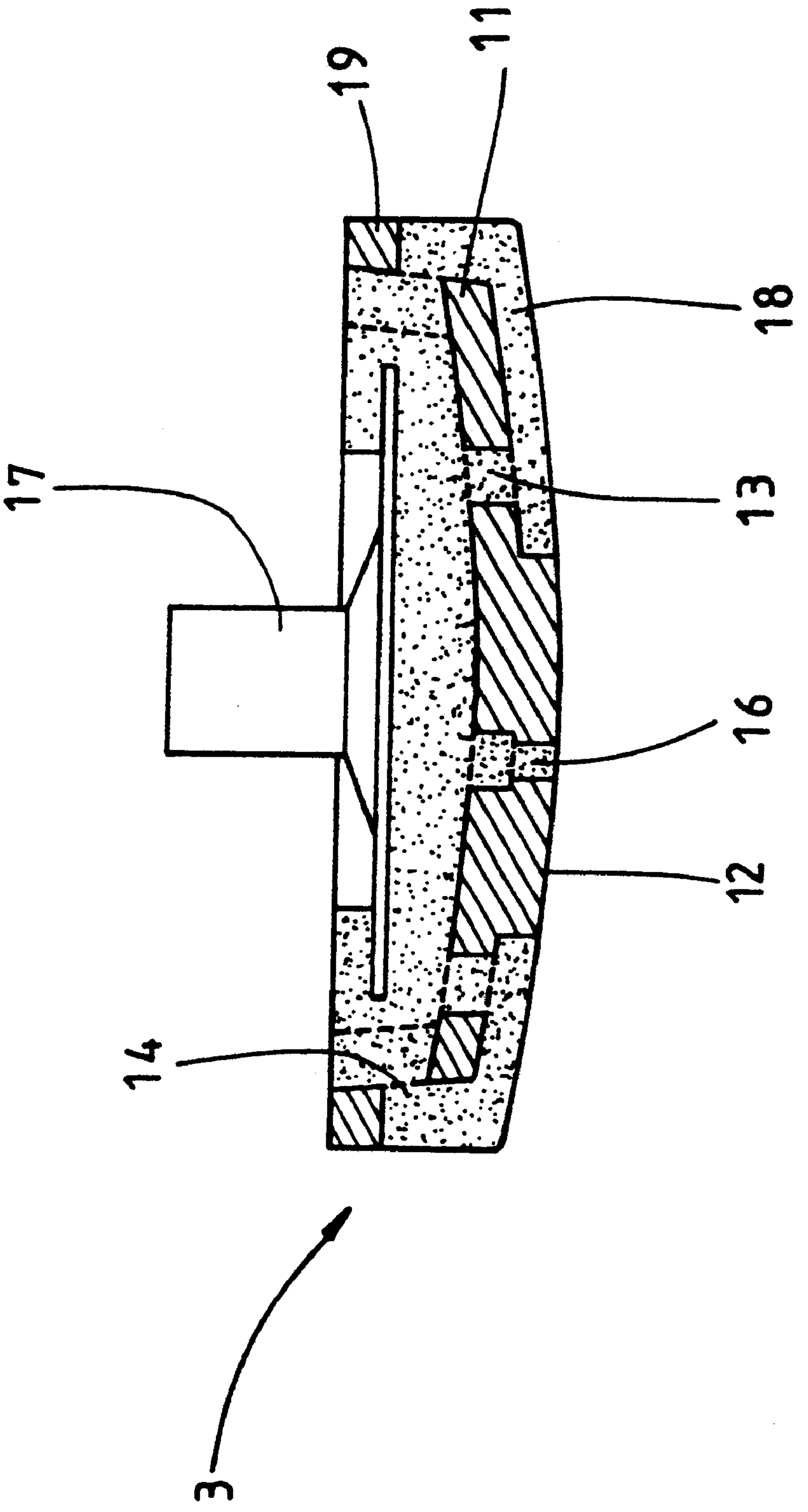
FIG. 3 is a sectional view after the covering of the blank material having the net layer in accordance with the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIGS. 1 to 4, there is shown the preferred embodiment of the present invention. In accordance with the present invention, a blank element 10 is first prepared and the blank element 10 is a one-piece body comprises a net layer 11, a patterned block 12 with specific trademark or marking. There are through holes 13 and feeding hole 14 provided on the net layer 11, and the patterned block 12 has an external portion 15 and a recessed interior section 16. By designing the recessed interior section 16, the pattern of the patterned block 12 can be made into any fine design.

In accordance with the present invention, the net layer 10 has an edge side 19 of appropriate height and the feeding holes 14 are positioned at the edge side 19.

The patterned block 12 is connected to the net layer 10 and is protruded to a specific height. The specific design can be a specific advertising design or marking. The interior 16 is also provided with net layer 10 with through hole 13.

The blank element 10 is placed into the base mold and the top mold 2 is first inserted with a male fastening element 17. After the base mold and the top mold after combined, a covering material 18 is injected, and the covering material 18 is then fed into various through hole 13 and the feeding holes 14. Thus, the covering material covers the net layer 11 and fills the recessed interior section 16 at the center of the patterned block 12. The blank element 10 containing the net layer 11 and the patterned block 12 can be a hard plastic or be made from a metal or by metal plating to form into any fabricated surface. If it is to be formed into a covering button

Figure 4:
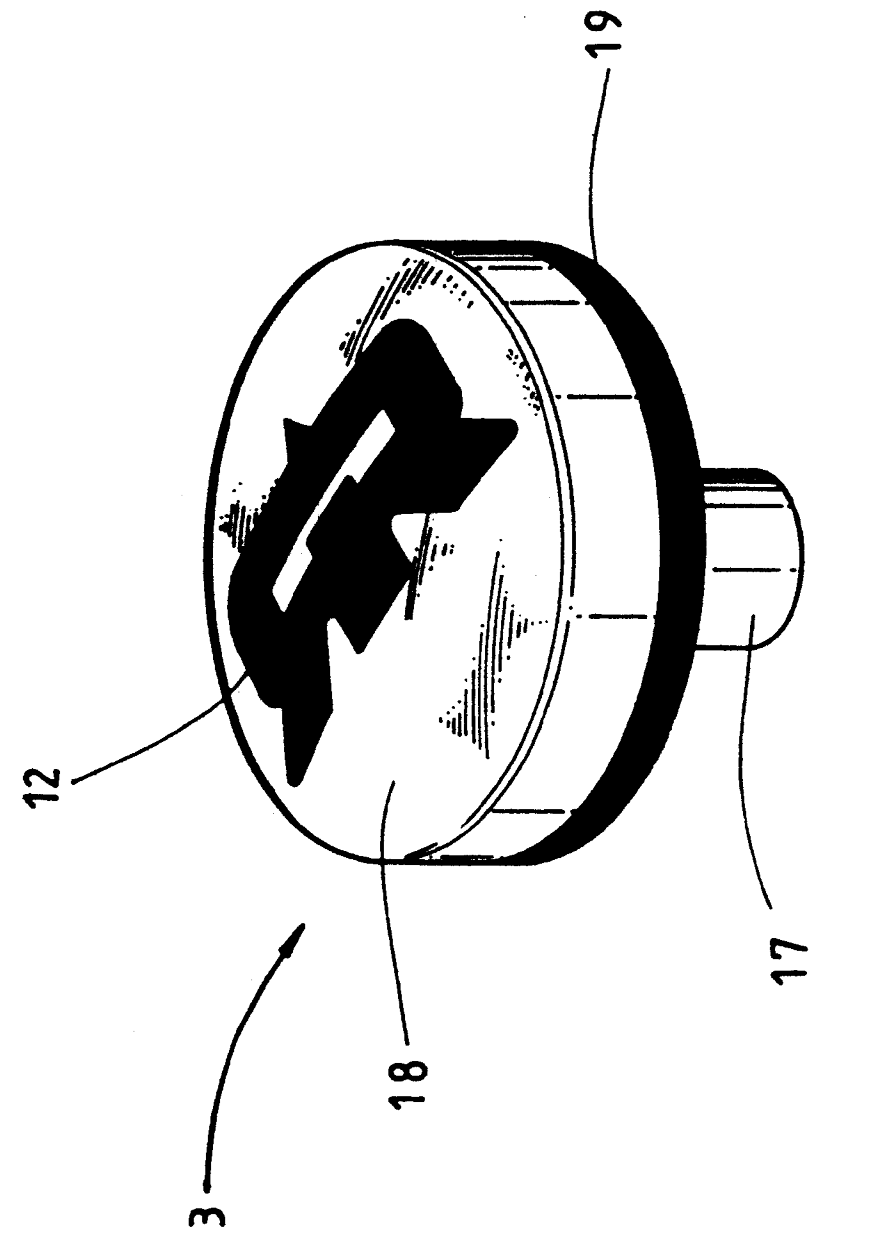
FIG. 4 shows a button of different material with two different colors in accordance with the present invention.

3 shown in FIG. 4, the aluminum surface is a patterned block 12 with good touch-feeling soft covering material. That is, a highly novel button with new structure is obtained.

Figure 5:
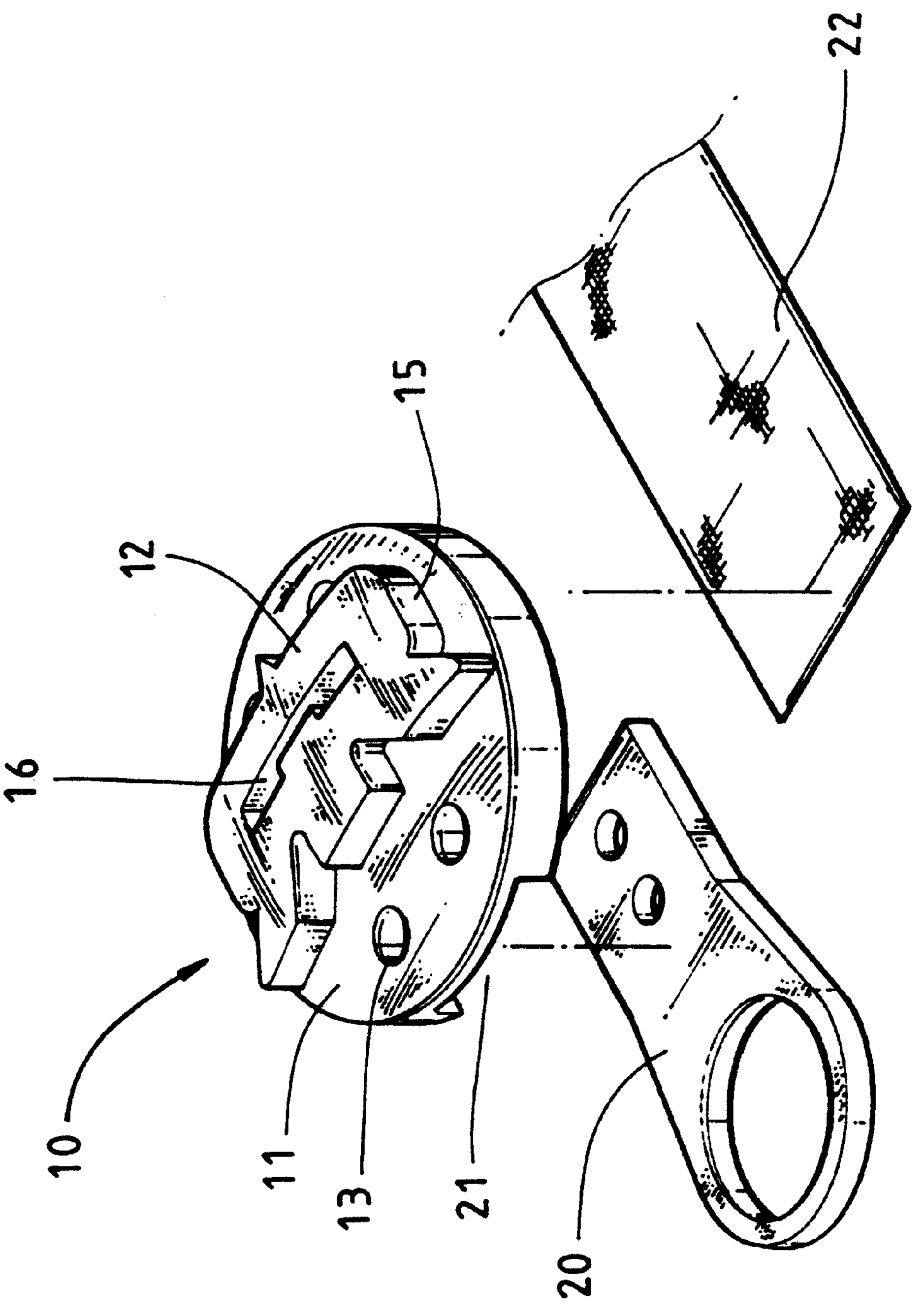
FIG. 5 is a perspective exploded view of the button structure of the present invention.
Figure 6:
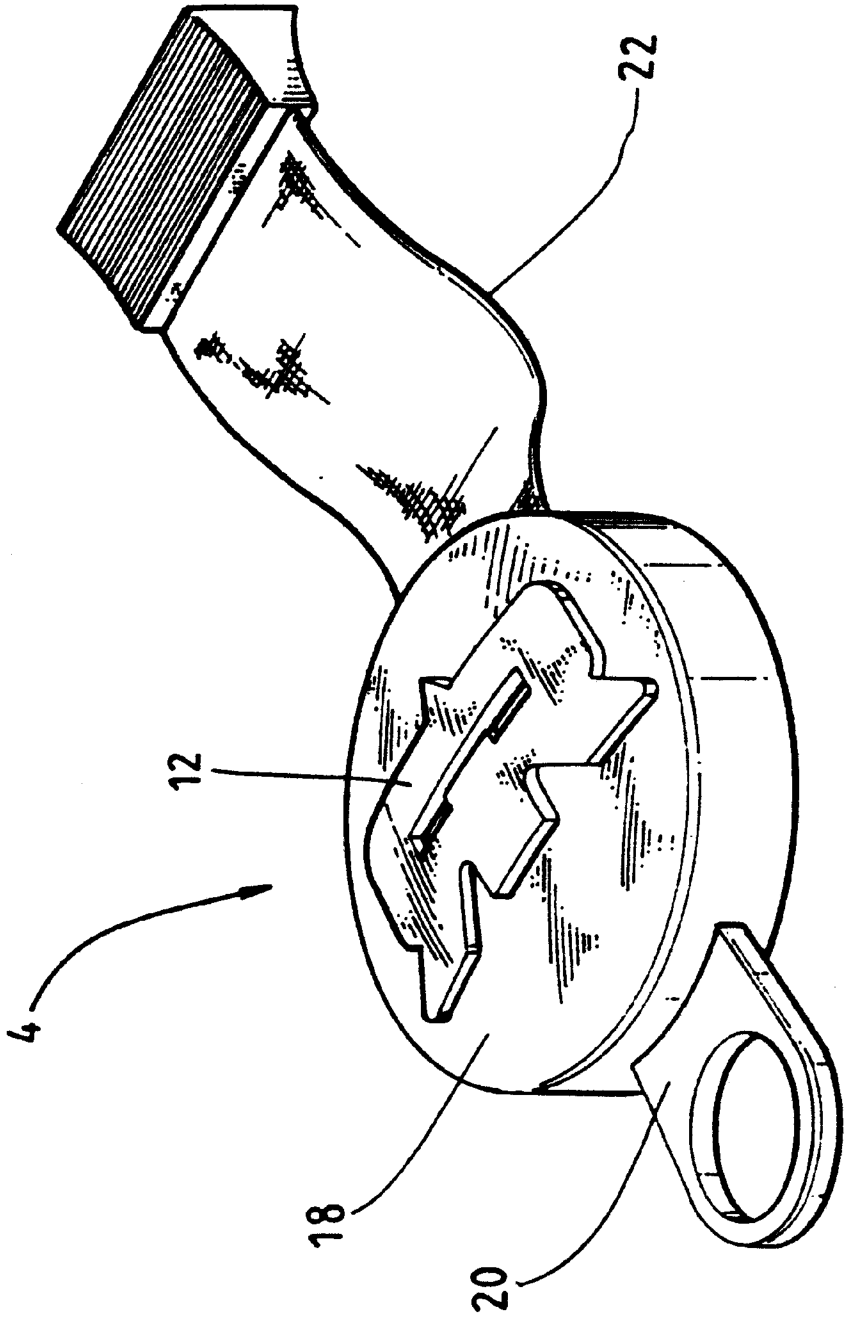
FIG. 6 is a perspective view of another preferred embodiment.
Figure 7:
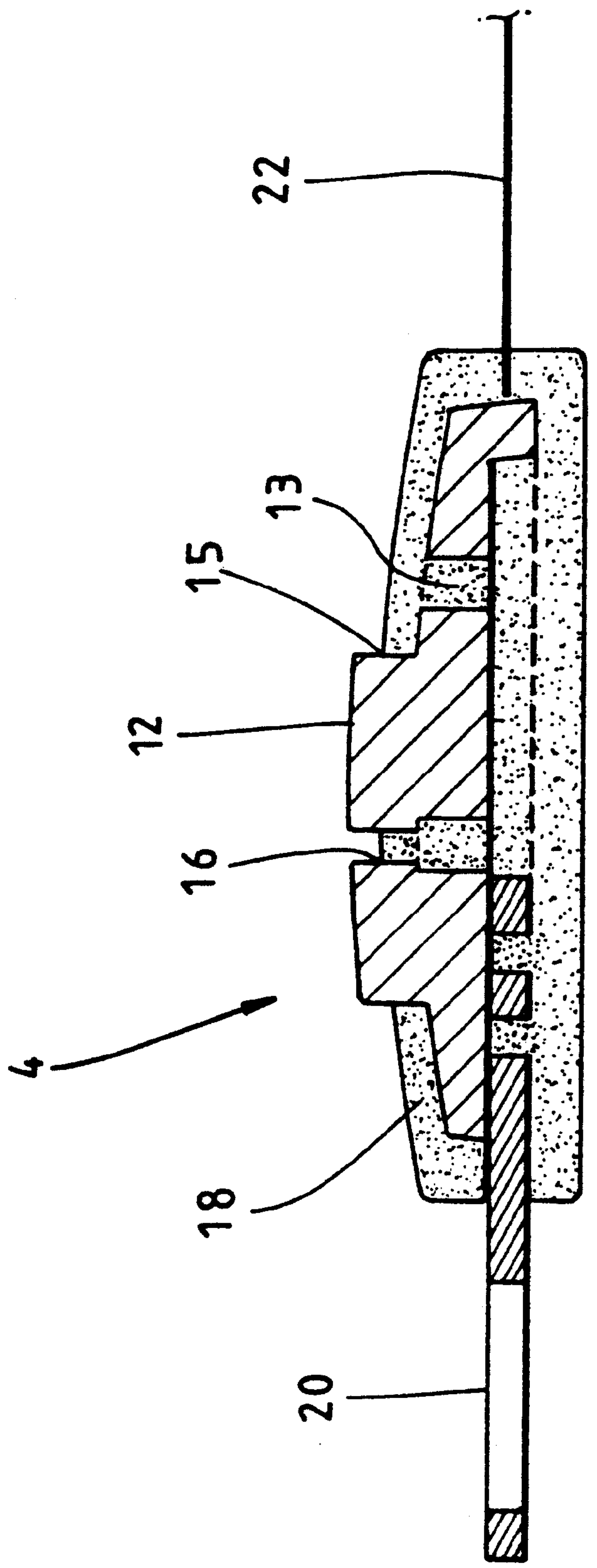
FIG. 7 is a sectional view of another preferred embodiment.

FIGS. 5 to 7 show another preferred embodiment in accordance with the present invention. A notch 21 is made at the edge side of the net layer 11 of the blank 10, and the end terminal of the pulling tab 20 of zip-fastener is located into the notch 21 with an appropriate length protruded therefrom. At the same time, the blank element 10 and the pulling tab 20 are mounted into the mold to combine with a soft fabric strap 22. Thus, an advertising strap 4 for the pulling tab is obtained.

Figure 9:
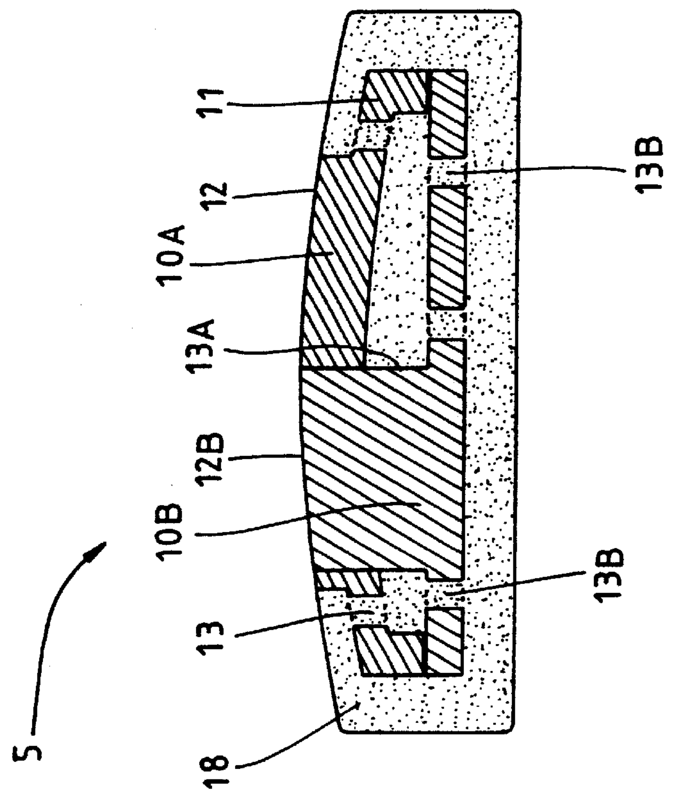
FIG. 9 is a sectional view of another preferred embodiment.
Figure 8:
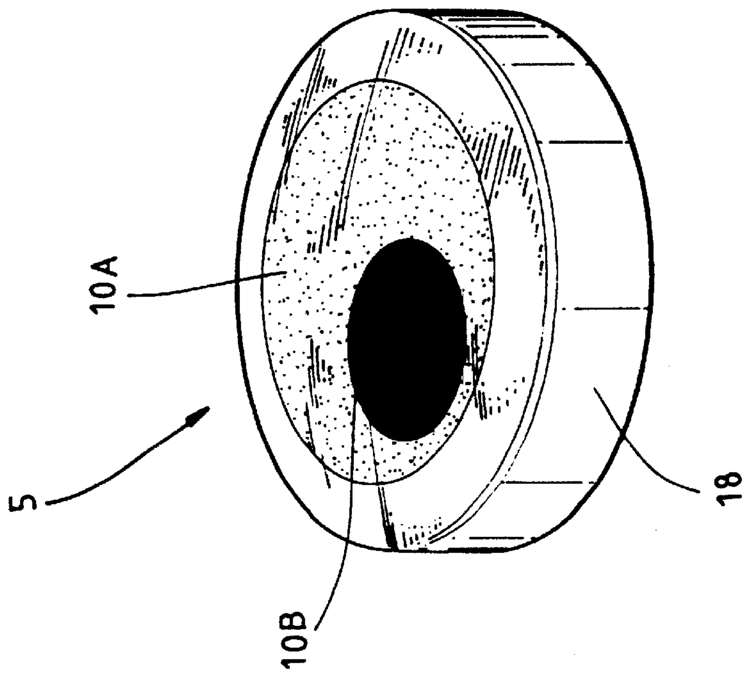
FIG. 8 is a perspective view of another preferred embodiment.

Referring to FIGS. 8 and 9, the first blank element 10A on the net layer 11 is formed with a large hole 13A and the arch-shaped surface of the blank element 10A is provided with a plurality of through holes 13, and the blank element is formed into patterned block 12. A second blank element 10B is placed at the bottom of the first blank element 10A. The patterned block 12B on the second blank element 10B passes through the large hole 13A. The second blank element 10B is also provided with a plurality of through holes 13B. After the first and the second blank elements are combined, they are placed into the mold and are covered by ejected covering material 18 to form into a button 5 with three colors.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi colors covered button with advertising object comprising at least a blank element (10), a male fastening element (17) and a covering material (18), characterized in that the blank element consists of a net layer (11) having a plurality of through holes (13), a patterned block (12) connected to the net layer (11), and the through holes (13) in communication with an external portion (15) of the patterned block (12) and a recessed interior section (16), the blank element (10) is positioned by top and bottom molds (1, 2) such that a covering material (18) can be ejected to cover the entire net layer (11) and the covering material is extended to cover the external portion (15) of the block (12) and the recessed portion (16), thereby a covered button with more than two different type of materials and colors is formed, wherein the blank element comprises a first blank element (10A) and a second blank element (10B), and the first blank element (10A) is provided with a large hole (13A) such that the second blank element (10B) which the patterned block (12B) of a higher height passes through the larger hole (13A) of the first blank element (10A) and the first blank element (10A) and the second blank element (10B) are placed into the molds and covers with the covering material (18) to form a covered button with three colors.

* * * * *